United States Patent [19]

Hirai

[11] Patent Number: 4,967,124
[45] Date of Patent: Oct. 30, 1990

[54] SERVO CONTROL APPARATUS
[75] Inventor: Masanori Hirai, Gifu, Japan
[73] Assignee: Teijin Seiki Company Limited, Osaka, Japan
[21] Appl. No.: 375,680
[22] Filed: Jul. 5, 1989
[30] Foreign Application Priority Data
  Jul. 12, 1988 [JP] Japan ................. 63-171873
[51] Int. Cl.$^5$ .................. H02P 1/04; B64C 13/38
[52] U.S. Cl. .................. 318/564; 318/565; 318/563; 364/167.01
[58] Field of Search .............. 318/560–638, 318/639; 364/167.01

[56] References Cited

U.S. PATENT DOCUMENTS

| 3,433,125 | 3/1969 | Gemmell | 318/564 X |
|---|---|---|---|
| 3,795,853 | 3/1974 | Whitehouse | 318/626 X |
| 4,078,750 | 3/1978 | Tomlinson | 318/563 X |
| 4,280,083 | 7/1981 | Hirai et al. | 318/565 |
| 4,304,375 | 12/1981 | Builta et al. | 318/564 X |
| 4,334,216 | 6/1982 | Lacroix | 318/565 X |
| 4,397,368 | 8/1983 | Takeshima | 318/628 X |
| 4,595,979 | 6/1986 | Arai et al. | 364/167.01 X |
| 4,607,202 | 8/1986 | Koenig | 318/628 |
| 4,628,409 | 12/1986 | Hammett | 318/599 X |
| 4,658,908 | 4/1987 | Hannukainen | 318/624 X |
| 4,790,233 | 12/1988 | Backe et al. | 364/167.01 X |

Primary Examiner—William M. Shoop, Jr.
Assistant Examiner—Paul Ip
Attorney, Agent, or Firm—Lane, Aitken and McCann

[57] ABSTRACT

In a servo control apparatus wherein a load is controlled by a deviation between a command signal corresponding to a target value and a detected position signal of an actuator of a servo system and which has a plurality of the servo systems arranged in parallel with respect to the load, the servo control apparatus comprising: a forward circuit for producing a signal that changes in response to an external force exerted on the actuator; first feedback circuit for detecting the signal of the forward circuit and feeding the same back to the command signal; and second feedback circuit for feeding the detected position signal of the actuator back to the command signal, producing a deviation signal representative of a deviation between the position signal and the command signal, integrating the deviation signal, and inputting the integrated signal to the forward circuit.

2 Claims, 5 Drawing Sheets

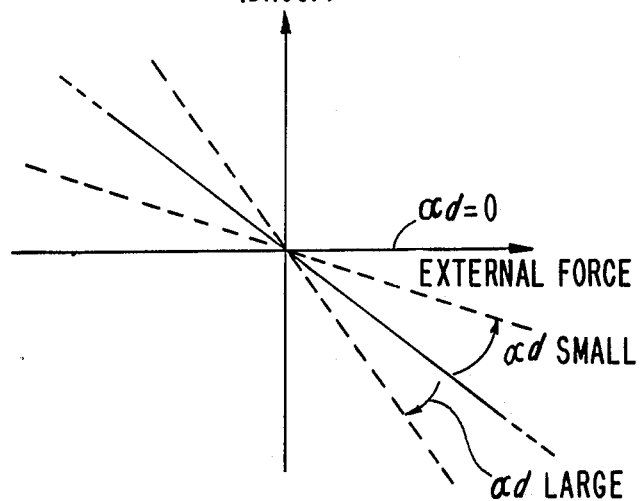

SERVO CONTROL APPARATUS

FIELD OF THE INVENTION

The present invention relates in general to servo control apparatuses, and in particular to such apparatuses wherein a reduction of "force fight" in electro hydraulic servo, systems (hereinafter referred to as servo systems) arranged in parallel is achieved.

DESCRIPTION OF THE PRIOR ART

Typically, a servomechanism (hereinafter referred to as a servomechanism) is constructed so as to control the position, heading, attitude or the like of an object by the deviation (error) between a set target and the actual response. The servomechanism is employed in various controls such as a position or attitude control of ships, aircraft and space satellites, a tool position control of machine tools and the like.

Such a servomechanism is normally operated at relatively high speeds, and therefore it is required to pay attention to the influence of the load system in a static condition, taking account of dynamic characteristics.

The example shown in FIG. 7 is representative for a servo control apparatus applied to the conventional servomechanism of the above kind. In FIG. 7, a flap for controlling a flight is denoted by reference numeral 1 and connected with two actuators 2 and 3 disposed in parallel. The actuators 2 and 3 have incorporated therein pistons 2a and 3a respectively which are controlled by electro hydraulic servo valves (EHSV) 4 and 5 each including a feedback control circuit. The same command signals are inputted to the valves 4 and 5 so that when one actuator 2 or 3 failed, the flap 1 can be regularly controlled by the other actuator 2 or 3. Direct drive valves (DDV) may be used as servo valves in place of the servo valves 4 and 5.

However, although in the above conventional servo control apparatus the actuators were selected so as to have the same performance, there were a slight difference between the outputs of the actuators, even if the same command signals were inputted, because of the position accuracy, mounting error and the like of each actuator. For this reason, the mounting portion of each actuator is deformed, and this deformation causes external forces to occur in the actuator, i.e. an occurrence of "force fight". This force fight has not been fully overcome by the conventional servo control apparatus.

For example, assuming that the piston positions of the actuators 2 and 3 are Xp1 and Xp2, the piston positions Xp1 and Xp2 would differ from each other even if the same command signals were inputted, and therefore the force fight occurs, as shown by broken lines in FIG. 7. The force fight used herein is intended to mean a fight between two forces. If the force fight occurs, an excess load than required will be applied to the flap, and therefore the flap is subjected to metal fatigue. Such a force fight is produced by errors of each component constituting the servomechanism, and it is preferable that the rigidity of each actuator be smaller, since the fight force is determined particularly by the rigidity. It is consequently required to reduce the force fight.

In order to reduce the force fight, there has been proposed a method of increasing a steady-state deviation (a so-called droop) caused by external force of the servo system. For example, in order to increase the deviation, an amount of leak between the cylinder chambers is increased, and also a pressure feedback control is carried out. However, the adjustment of leak or pressure feedback control is not effective means, since it requires a substantial labor and causes complication of the apparatus and an increase in production cost. Also, increasing the amount of leak is not preferable, since the efficiency of the actuators is reduced.

FIG. 8 shows another method of reducing the force fight by a control loop wherein an amount of control is not directly fed back. In FIG. 8, only one actuator 2 of two parallel actuators and one valve 4 of two electro hydraulic servo valves are shown. An external force Fd from the other actuator corresponding to the force fight is transmitted through a spring 6 to a piston 2a of the actuator 2. A position sensor 7 is provided between the actuator 2 and the spring 6 to detect the position or amount of displacement Xp of the actuator 2 and the deviation between the position sensor 7 and the common signal is fed to the servo valve 4. Although in this method a bad influence of the force fight is reduced by the spring 6, there is the problem that the system becomes unstable.

Accordingly, it is an objective of the present invention to provide a novel servo control apparatus which is capable of reducing force fight, without causing complication of the apparatus and an increase in production cost, by making it possible to adjust a steady-static deviation caused by external forces to an arbitrary value.

In accordance with an important aspect of the present invention, there is provided a servo apparatus comprising an input signal generator 18 which generates a command signal. An adding circuit receives the command signal and outputs a deviation signal. An integration circuit integrates the deviation signal and applies it to a servo amplifier, which produces an electric current signal in response to the integrated deviation signal, the current signal changing in response to an external force exerted on the actuator of the servo system. A position detector 15 detects the piston position of the actuator that is displaced in accordance with the current signal and outputs a position signal. A feedback circuit 31 amplifies the current signal with a variable gain and feeds the amplified current signal back to the adding circuit. A feedback circuit 32 feeds back the position signal to the adding circuit. The deviation signal produced by the adding circuit represents the sum of the command signal, the current signal and the position signal.

BRIEF DESCRIPTION OF THE DRAWINGS

The above and other objects and advantages will become apparent from the following detailed description when read in conjunction with the accompanying drawings wherein:

FIG. 5 is a diagram showing the relationship between the external force and the steady-state deviation, when the feedback gain is changed, FIG. 6 is a diagram showing the relationship between the external force and the steady-state deviation, when the feedback gain is a minus number.

DESCRIPTION OF THE PREFERRED EMBODIMENTS

Figure 1:
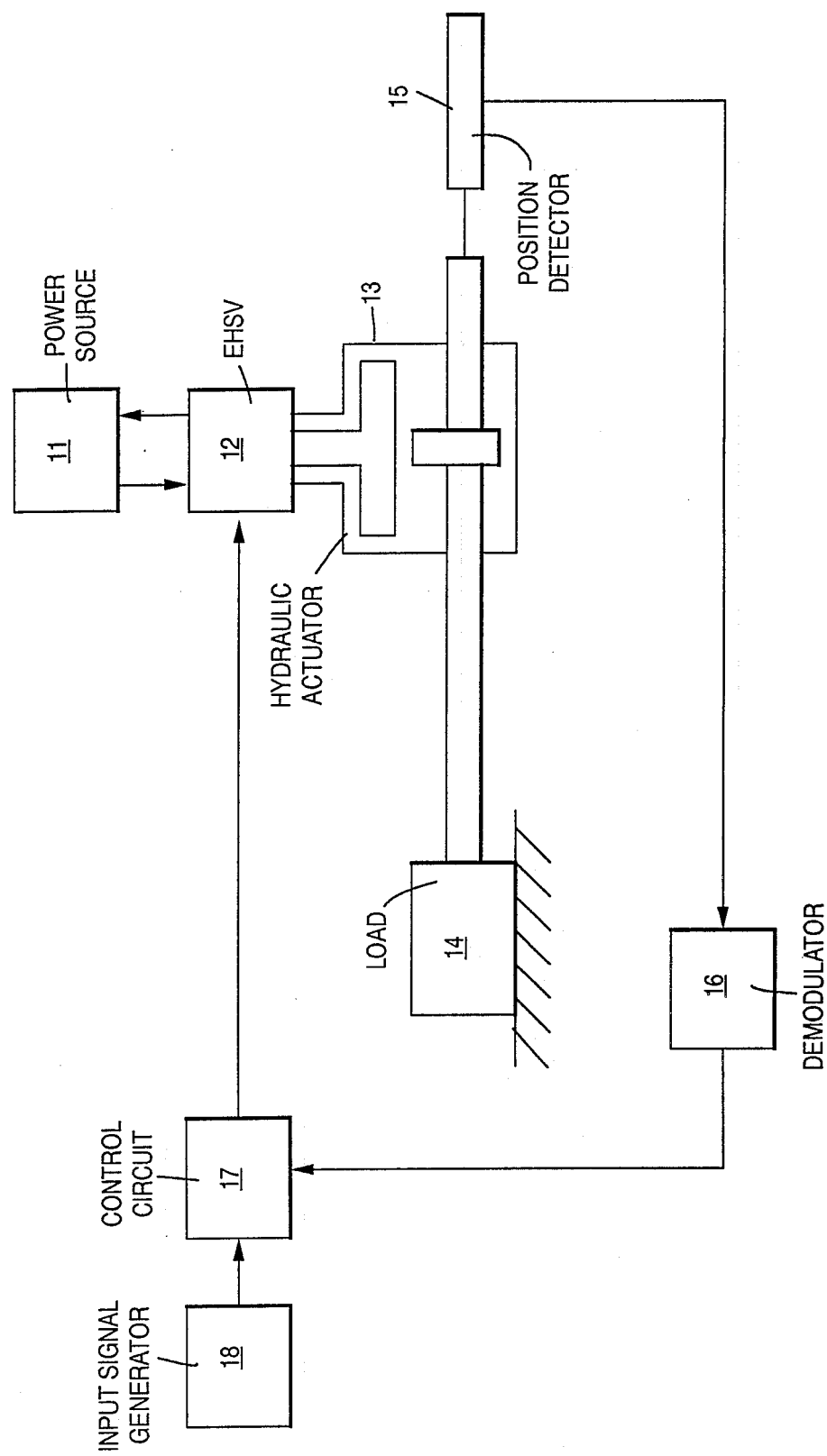
FIG. 1 is a diagram illustrating an embodiment of a servo control apparatus according to the present invention.

Referring initially to FIG. 1, there is shown a preferred embodiment of a servo control apparatus in accordance with the present invention. Although two servo systems are arranged in parallel, only one servo system is shown because they are identical with each other.

The hydraulic pressure of a hydraulic power source 11 is supplied through an electro hydraulic servo valve (EHSV) 12 to a hydraulic actuator 13 which drives a load 14 in response to the flow rate controlled by the servo valve 12. The servo valve 12 (corresponding to a control valve) is a kind of an electric-to-hydraulic convertor which is capable of controlling a hydraulic power corresponding to several horsepowers to several tens of horsepowers by a very small electric input, i.e. electric signal of several milliwatts. The hydraulic actuator 13 is preferable to have a quick response, and the load 14 is, for example, a flap of a main wing used as an attitude control of aircraft.

The position of the piston of the hydraulic actuator 13 is detected by a position detector 15 comprising a differential transformer. The position detector 15 converts the detected piston position into an electric signal and feeds the electric signal through a suitable compensating element back to a command signal that is transmitted to the hydraulic actuator 13. The output of the position detector 15 is inputted to a demodulator 16 which has a filter part for removing noise components of the output signal of the position detector 15, and the output signal is demodulated and amplified. The output of the demodulator 16 is inputted to a control circuit 17 to which a signal from an input-signal generator 18 is also inputted. The input-signal generator 18 generates the aforesaid command signal (corresponding to a reference input signal) indicating a target position of the load 14. The control circuit 17 calculates an amount of feedback control necessary to servo control in accordance with the deviation between the command signal and the output signal of the position detector 15 corresponding to the actual position and with the feedback amount of a current of the servo valve 12, and outputs an electric current signal to the servo valve 12.

Figure 2:
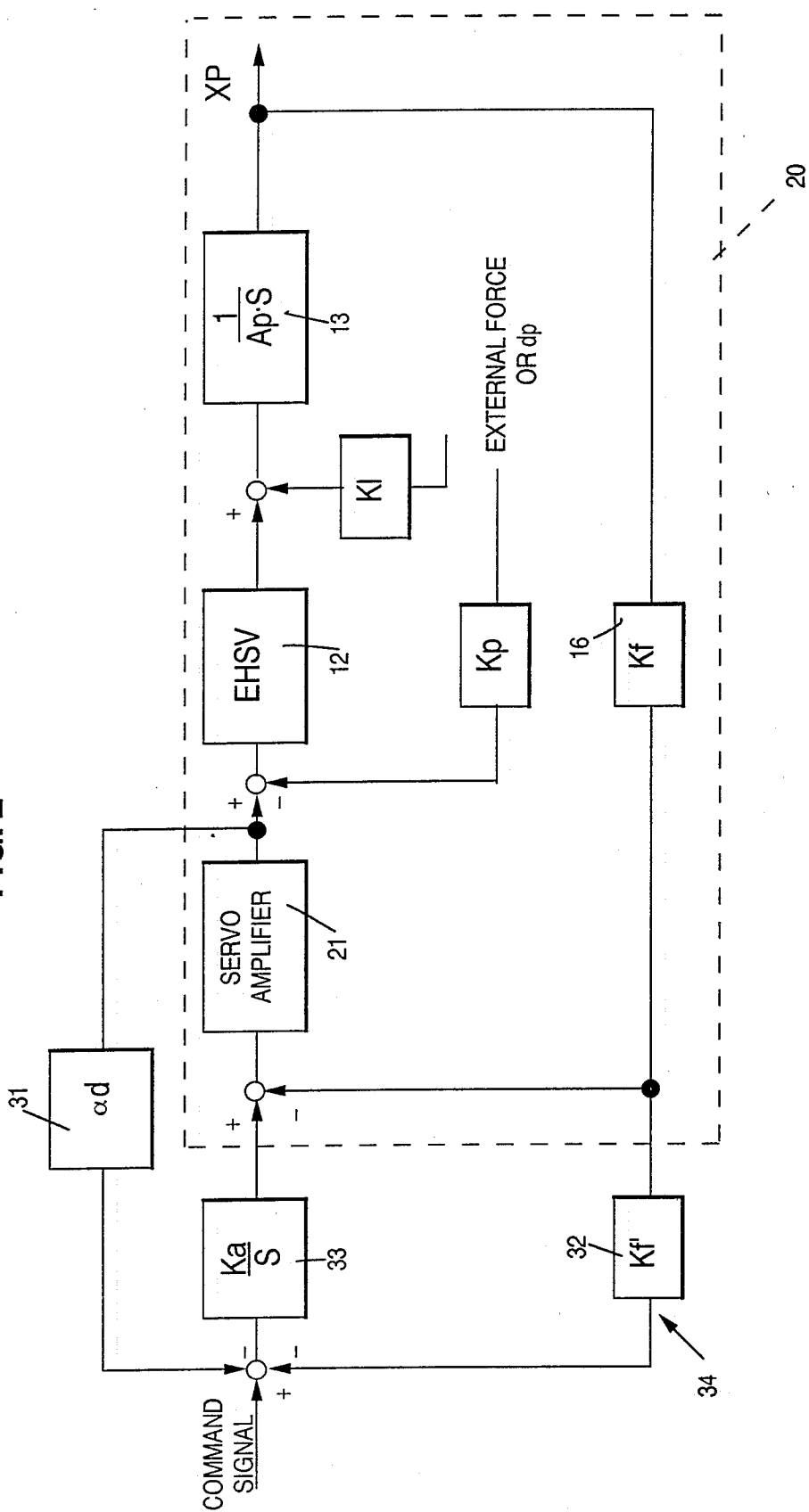
FIG. 2 is a block diagram illustrating a control method of the control circuit of FIG. 1.

FIG. 2 illustrates a control method of the control circuit 17 shown in FIG. 1. In FIG. 2, a piston-position feedback system is denoted by reference numeral 20 and corresponds to a normal electro hydraulic servo system of the prior art. The piston-position feedback system 20 includes a servo amplifier 21, the electro hydraulic servo valve 12 and hydraulic actuator 13 of FIG. 1. The servo amplifier 21 produces the above described current signal necessary for a servo control, and the current signal is supplied to the servo valve 12. The piston of the hydraulic actuator 13 is moved in response to the output of the servo valve 12, and the transfer functions at that time are shown. S denotes a Laplace operator, Ap a pressure receiving area of piston and Kf, Kf' and $\alpha d$ denote feedback gains. Kp denotes a feedback gain of pressure when a PQ servo valve is employed as the EHSV (electro hydraulic servo valve) ($K_p$ is 0 in the case of a general-purpose EHSV) and $K_L$ denotes an amount of leak. It is noted that the Kp and $K_L$ shown in FIG. 2 are expressed so as to be equivalent to the influence of the external force (exerted on the actuator) or dP (a differential pressure of a cylinder type actuator) on the system.

The output or current signal of the servo amplifier 21 is amplified with a predetermined gain $\alpha d$ by a feedback circuit or first feedback means 31, and the deviation between the amplified signal and the command signal is calculated. The detected signal of the piston position is also amplified with a feedback gain Kf' by a feedback circuit 32, and the deviation between the amplified signal and the command signal is calculated. The deviations of the current feedback amount and the piston-position feedback amount with respect to the command signal are integrated with a transfer function Ka/S by an integration circuit 33, and the deviation between this integrated output and the piston-position feedback amount of the demodulator 16 is inputted to the servo amplifier 21 which produces an input signal of a normal servo loop.

The operation of the servo control apparatus according to the present invention will hereinafter be described in detail.

Figure 3:
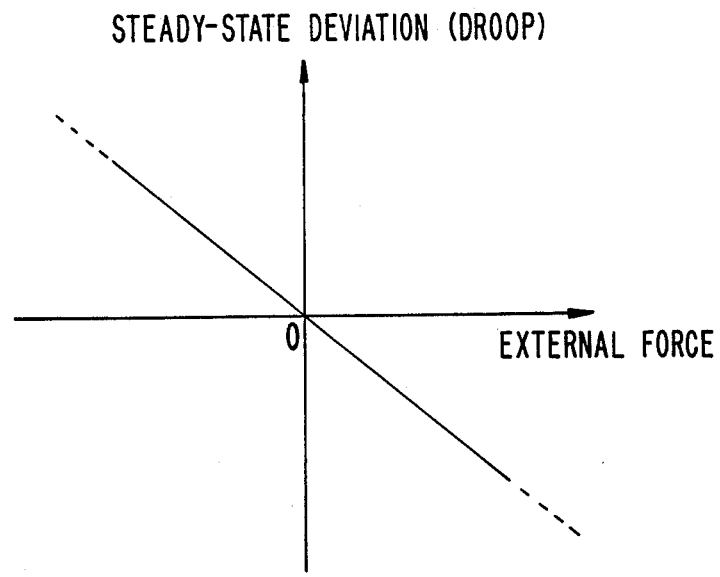
FIG. 3 is a diagram showing a steady-state deviation in a normal electro hydraulic servo system produced by external forces.
Figure 4:
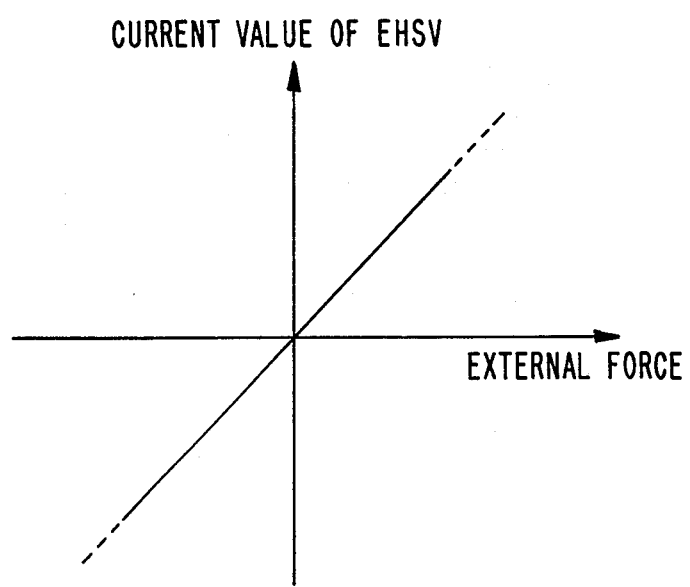
FIG. 4 is a diagram showing a current value that occurs in the servo valve of FIG. 1 due to the steady-state deviation.
Figure 7:
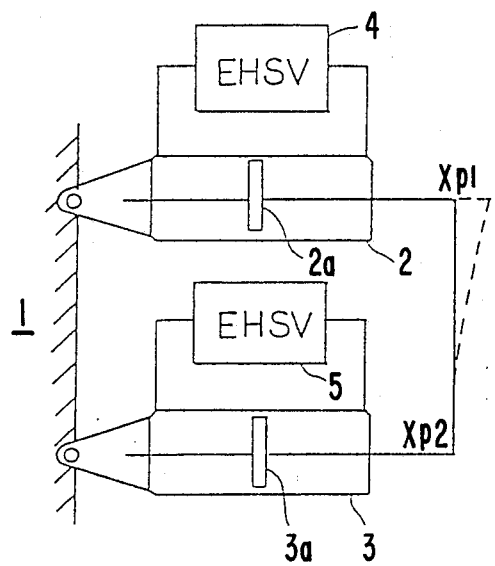
FIG. 7 is a schematic view showing a conventional servo control apparatus.

In a normal electro hydraulic servo system, using a general-purpose EHSV a steady-state deviation by external forces is produced as shown in FIG. 3, due to a slight leak of oil between cylinder chambers of the hydraulic actuator 13 through the EHSV 12. Consequently, when the command signal is zero the servo valve 12 is balanced at a position offset from its neutral position, and a very small current occurs in the servo valve 12. The value of this current is directly proportional to the offset quantity of the servo valve 12 and is expressed as a fixed function, with respect to the external forces, as shown in FIG. 4.

If the amount of leak is increased, it is effective to reduce the force fight, but this method is not suitable since the cost of adjusting the amount of leak is increased and the efficiency of the hydraulic actuator 13 is reduced. However, it is necessary to increase the amount of leak to a certain degree in order to reduce the force fight. This means that the rigidity of the hydraulic actuator 13 is reduced. That is, it is necessary to reduce the rigidity of the hydraulic actuator in order to reduce the force fight, and the problem of the force fight can be overcome if this rigidity can be easily set to an arbitrary value. For that reason, it is necessary that the steady-state deviation be increased to a certain degree of magnitude. However, on the other hand, since a reduction in the output occurs, it is also necessary to overcome this problem. In order to overcome this problem, the output of the servo amplifier 21 is fed back and the deviation between the output and the command signal is calculated in accordance with the present invention.

In the case that the current value of the servo amplifier 21 is not fed back, for the example in the case of $\alpha d=0$, only the output signal of the hydraulic actuator 13 is fed back, and the deviation between this output signal and the command signal is integrated by the integration circuit 33 and inputted to the servo amplifier 21. As a result, the steady-state deviation becomes "0". The reasons are as follows. The output of the integration circuit 33 continues to increase or decrease until the input thereto, that is, the deviation between the output of the actuator 13 and the command signal becomes zero, and becomes constant when the deviation has become zero. That is, if there is an integral element, S in the steady state is normally equal to 0 as in the case of a process control system, and therefore the steady-state deviation becomes 0. While the deviation =0 is useful, a velocity of control is decreased and dynamic characteristic is deteriorated. This problem can be overcome by providing a phase-lead circuit.

Thus, if the steady-state deviation becomes "0", the rigidity of the actuator becomes infinity, since the actuator rigidity can be expressed as (external force)/(-steady-state deviation).

On the other hand, in the case that the current value of the servo amplifier 21 is fed back, the stead-state deviation changes, as shown in FIG. 5, by the feedback gain $\alpha d$ of the feedback circuit 31. For example, when the command signal is zero, if external forces are applied to the hydraulic actuator 13 (for example, in the case that the piston position Xp of one actuator is changed by the force fight), then the piston position of the hydraulic actuator 13 changes and the servo valve 12 is therefore balanced at a position offset from its neutral position and the very small current produced in the servo valve 12 (the output current of the servo amplifier 21) is fed back by the feedback circuit 31. When the feedback signal from the actuator 13 has become a certain value (that is, when there is a predetermined deviation in the actuator 13), the sum of the feedback signal from the actuator 13 and the feedback signal from the servo amplifier 21 will become zero. Consequently, the output of the integration circuit 33 becomes constant, and thus the system becomes stable. Therefore, the magnitude of the steady-state deviation of the actuator 13 depends upon the magnitude of the gain $\alpha d$ when the current of the servo amplifier 21 is fed back and if the gain $\alpha d$ becomes larger, the steady-state deviation becomes larger. Consequently, if the value of $\alpha d$ is adjusted, an arbitrary steady-state deviation can be obtained. As previously indicated, since the actuator rigidity can be expressed as (external force)/(steady-state deviation), it is possible to obtain an arbitrary actuator rigidity by altering a steady-state deviation.

From the foregoing description, in this embodiment, the change of the current of the servo amplifier 21 is detected as the force fight by the external force and fed back. Therefore, the rigidity of the hydraulic actuator 13 can be reduced from the aforesaid equation (external force/steady-state deviation) and the force fight thus reduced.

Thus, according to the present invention, the force fight is reduced. Further, since this is done only by adding additional electric circuit, the apparatus of the present invention becomes structurally simple and unexpensive. Also, depending upon a servo system, the amount of reduction of the force fight can easily be changed merely by changing the gain $\alpha d$ of the feedback circuit 31.

Figure 8:
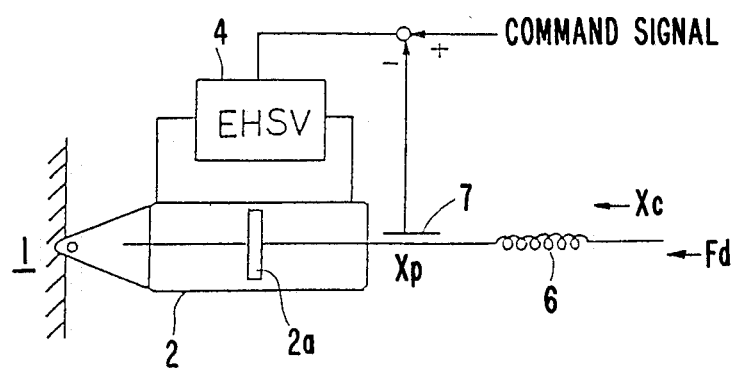
FIG. 8 is a view similar to FIG. 7 but showing another conventional servo control apparatus.

It is noted that, depending upon a servo system, the steady-state deviation can also be set to a minus number by setting the feedback gain $\alpha d$ to a minus number. Particularly, the system as shown in FIG. 8 has its disadvantages in that the steady-state deviation occurs in the amount of control and the accuracy of control is thus reduced, although the force fight can be reduced. If this system is applied to the present invention and the feedback gain $\alpha d$ is set to a minus number, the steady-state deviation of the actuator by the external force becomes a minus number, and the amount of deformation (Xp−Xc) of the spring caused by the external force becomes a plus number, as shown in FIG. 6. Accordingly, the steady-state deviation of the control amount of the both put together becomes very small, as shown by the broken lines in FIG. 6, and the aforesaid problem is thus eliminated.

While in the above embodiment the output current signal of the servo amplifier 21 has been used as the feedback signal of the feedback circuit 31, it is noted that the valve position of the servo valve 12 may also be detected and fed back.

Further, the application of the present invention is not limited to the flight control of aircraft, and the present invention is applicable to all of servo systems wherein the rigidity of actuators is required to be adjusted.

From the foregoing description, it will be seen that there is provided, in accordance with the present invention, a novel servo control apparatus which is capable of reducing force fight, without causing complication of the apparatus and an increase in production cost, by making it possible to adjust a steady-state deviation caused by external forces to an arbitrary value. Although the invention has been described with a certain degree of particularity, it is understood that the present disclosure has been made only by way of example and that numerous changes in the details of the construction and the combination and arrangement of parts may be made without departing from the scope of the invention as hereinafter claimed.

What I claim is:

1. A servo control apparatus comprising:
    means for generating a command signal;
    adding means for outputting a deviation signal, the command signal being inputted to said adding means;
    means for integrating said deviation signal;
    means for producing an electric current signal in response to the integrated deviation signal, the current signal changing in response to an external force exerted on an actuator of a servo system;
    means for detecting a piston position of said actuator that is displaced in accordance with said current signal and for outputting a position signal;
    means for amplifying said current signal with a variable gain and feeding the amplified current signal back to said adding means; and
    means for feeding said position signal back to said adding means;
    said deviation signal of said adding means being obtained by the sum of said command signal, said current signal and said position signal.

2. A servo control apparatus comprising:
    means for generating a command signal;
    first adding means for outputting a first deviation signal, the command signal being inputted to said first adding means;
    means for integrating said first deviation signal;
    second adding means for outputting a second deviation signal, the integrated first deviation signal being inputted to said second adding means;
    means for producing an electric current signal in response to said second deviation signal, the current signal changing in response to an external force exerted on an actuator of a servo system;
    means for detecting a piston position of said actuator that is displaced in accordance with said current signal and for outputting a position signal;

means for amplifying said current signal with a variable gain and feeding the amplified current signal back to said first adding means; and
means for feeding said position signal back to said first adding means and said second adding means; the second deviation signal of said second adding means being obtained by the sum of said first deviation signal and said position signal;
said first deviation signal of said first adding means being obtained by the sum of said command signal, said current signal and said position signal.

* * * * *